(12) United States Patent
Lonigro et al.

(10) Patent No.: US 6,522,249 B1
(45) Date of Patent: Feb. 18, 2003

(54) TWO WIRE OUTPUT/POWER MECHANISM FOR REMOTE DEVICES

(75) Inventors: Dennis A. Lonigro, Needham, MA (US); David J. Wilbur, Braintree, MA (US); Dale A. Zeskind, Wayland, MA (US)

(73) Assignee: United Electric Controls, Co., Watertown, MA (US)

( * ) Notice: Subject to any disclaimer, the term of this patent is extended or adjusted under 35 U.S.C. 154(b) by 17 days.

(21) Appl. No.: 09/943,112

(22) Filed: Aug. 30, 2001

(51) Int. Cl.[7] ................................................. G08B 1/08
(52) U.S. Cl. ...................... 340/533; 340/531; 340/538; 340/310.01; 340/310.06
(58) Field of Search ................................ 340/533, 531, 340/538, 310.01, 310.06

(56) References Cited

U.S. PATENT DOCUMENTS

| | | |
|---|---|---|
| 3,917,907 A | 11/1975 | Bartelink |
| 4,149,213 A | 4/1979 | Flemons |
| 4,168,443 A | 9/1979 | Periot |
| 4,780,788 A | 10/1988 | Kammerer et al. |
| 5,747,895 A | 5/1998 | Minassian |
| 5,760,498 A | 6/1998 | Park |
| 5,825,233 A | 10/1998 | Lamarche et al. |
| 5,831,349 A | 11/1998 | Weng |
| 6,339,373 B1 | 1/2002 | Zeskind et al. |

*Primary Examiner*—Daryl Pope
(74) *Attorney, Agent, or Firm*—Wolf, Greenfield & Sack, P.C.

(57) ABSTRACT

An interface that provides selected information from a remote device to a utilization mechanism over a two-wire connection, wherein all power for the interface and the remote device is received from the utilization mechanism over the same two-wire connection. A switch circuit provides a high impedance between first and second wires of the two-wire connection when open and a low impedance between the wires when closed. Current flow through the switch circuit is sensed by the utilization mechanism as indicative of information from the remote device. The interface comprises a voltage regulator that provides a regulated voltage to components of the interface and the remote device, and a current regulator that regulates current provided to the voltage regulator from the two-wire connection, when the switch circuit is open, to below a predetermined level at which the utilization mechanism interprets the switch circuit as being in the open state.

16 Claims, 5 Drawing Sheets

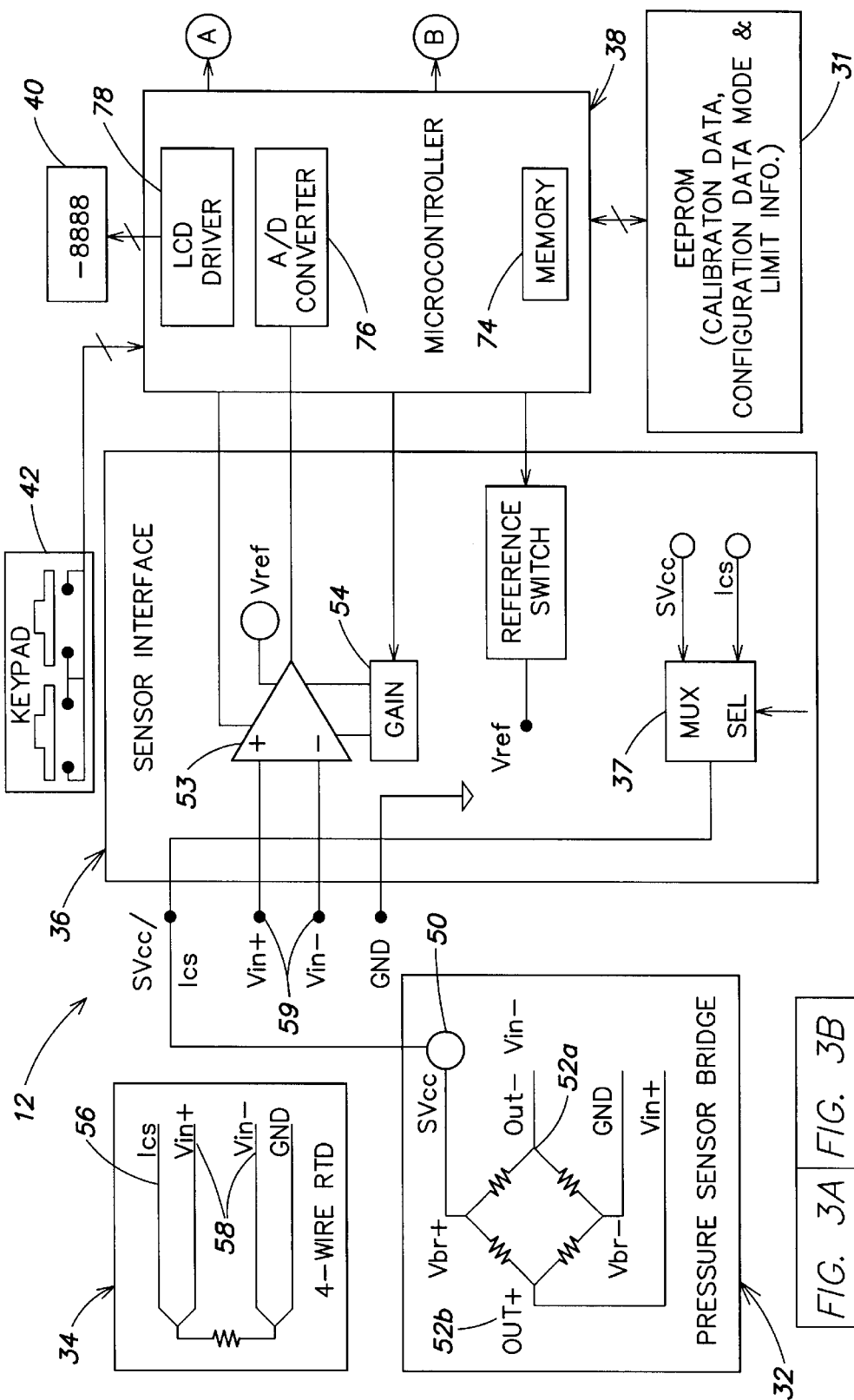

TWO WIRE OUTPUT/POWER MECHANISM FOR REMOTE DEVICES

FIELD OF THE INVENTION

This invention relates to remote devices that both provide output to and receive operating power from a utilization mechanism over a two-wire connection.

BACKGROUND OF THE INVENTION

It is often desirable to monitor the pressure or temperature of a fluid or gas in an industrial process and to signal when a certain threshold has been exceeded. There are several devices known in the art that provide such monitoring. These devices may compare the measured value of pressure or temperature to a programmed threshold and provide a switch transition to indicate that the threshold has been exceeded.

Threshold detection and switching functions can be performed using a variety of electromechanical or electronic devices. Electromechanical pressure and temperature switches employ mechanical means to open or close a switch contact or set of switch contacts when certain conditions are satisfied. Such electromechanical switches generally require no power to operate, and therefore the only wire connection that need be made to the device is a two-wire connection to detect the switch state. However, electromechanical switches are in general less flexible than electronic switches in that the threshold must be set at the factory or adjusted in the field using specialized equipment.

Electronic pressure and temperature switches offer various modes of operation, adjustable thresholds and other features that can be programmed by the user in the field. They may include circuitry to monitor, display and communicate information about the overall status and health of the device and system. While these devices offer more flexibility, they typically require additional wires to supply power for the electronic circuitry. They may also require a battery or other power source at the switch. This additional wiring or local power supply contributes to the cost of field installations and is also a source of potential failure. Additionally, the need for extra power wires exclude the use of electronic switches as direct replacements for two-wire mechanical devices. There are also maintenance and reliability disadvantages of a battery at the switch.

SUMMARY OF THE INVENTION

According to one embodiment of the present invention, there is an interface that provides selected information from a sensor mechanism to a utilization mechanism over a two-wire connection, all power for the interface and the sensor mechanism being received from the utilization mechanism over the two-wire connection. The interface comprises a switch circuit connected between first and second wires of the two-wire connection, the switch circuit providing a high impedance between the first and second wires when open and a low impedance between the first and second wires when closed. The state of the switch circuit is selectively controlled by the sensor mechanism, and current flow through the switch circuit is sensed by the utilization mechanism as indicative of selected information from the sensor mechanism. The interface comprises a voltage regulator that provides a selected voltage to components of the interface and the sensor mechanism, and a current regulator, operative at least when the switch circuit is open, that regulates a current provided to the voltage regulator from the first and second wires to below a predetermined level.

According to another example, an interface provides information from a remote device to a utilization mechanism over a two wire connection, the interface comprising a switch circuit that provides a high impedance between first and second wires of the two wire connection when in an open state and a low impedance between the first and second wires when in a closed state, the state of the switch circuit being indicative of the information from the remote device. The interface also comprises a voltage regulator that provides a regulated voltage to at least one component of the remote device, and a current regulator, coupled to the voltage regulator and the switch circuit, that limits an amount of current provided to the voltage regulator when the switch circuit is in the open state. The interface also comprises a shunt regulator, coupled to the switch circuit, that regulates a terminal voltage across the two-wire connection to a predetermined level when the switch circuit is in a closed state and a bypass that bypasses the current regulator when the switch circuit is in the closed state to enable a higher current to be provided to the voltage regulator. The interface and the remote device receive all operating power from the utilization mechanism over the two wire connection.

The present invention also includes a method of providing selected information from a remote device to a utilization mechanism over a two wire connection, the remote device receiving all operating power from the utilization mechanism. The method comprises providing a signal from the remote device over the two-wire connection and switching a switch circuit of the remote device between a closed state and an open state to provide the selected information from the remote device, the switch circuit passing the signal to the utilization mechanism when in the closed state and the switch circuit presenting a high impedance across the two-wire connection when in the open state. The method also includes providing an input to a voltage regulating device, a regulated output voltage being provided by the voltage regulating device to the remote device, and limiting current when the switch circuit is in the open state to below a predetermined level at which the utilization mechanism interprets the switch circuit as being in the open state. The method further includes regulating voltage across the two-wire connection when the switch circuit is in the closed state to a predetermined value.

According to yet another example, an interface for providing selected information from a sensor mechanism to a utilization mechanism over a two-wire connection comprises a bistable device that provides a high impedance between first and second wires of the two wire connection when in a first state and a low impedance between the first and second wires when in a second state. The interface also comprises voltage regulating means for controlling a voltage provided to at least selected components of the sensor mechanism, and means for limiting current provided to the voltage regulating means from the two-wire connection when the bistable component is in its first state to a current less than that recognized by the utilization mechanism as an indication of the bistable component being in its second state. All power for the interface and the sensor mechanism is received from the utilization mechanism over the two-wire connection.

The foregoing and other objects, features and advantages of the invention will be apparent from the following detailed description of an illustrative embodiment as illustrated in the accompanying drawings.

BRIEF DESCRIPTION OF THE DRAWINGS

In the drawings in which like reference numerals indicate like elements:

FIGS. 3A–B are a schematic block diagram of one example of a sensor mechanism suitable for use in practicing the teachings of the invention.

DETAILED DESCRIPTION

For purposes of illustration, at least one exemplary embodiment and aspects thereof will now be described in detail with reference to the accompanying figures. It is to be appreciated that like elements may be disclosed in different figures and may not be described in detail with reference to each figure.

Figure 1:
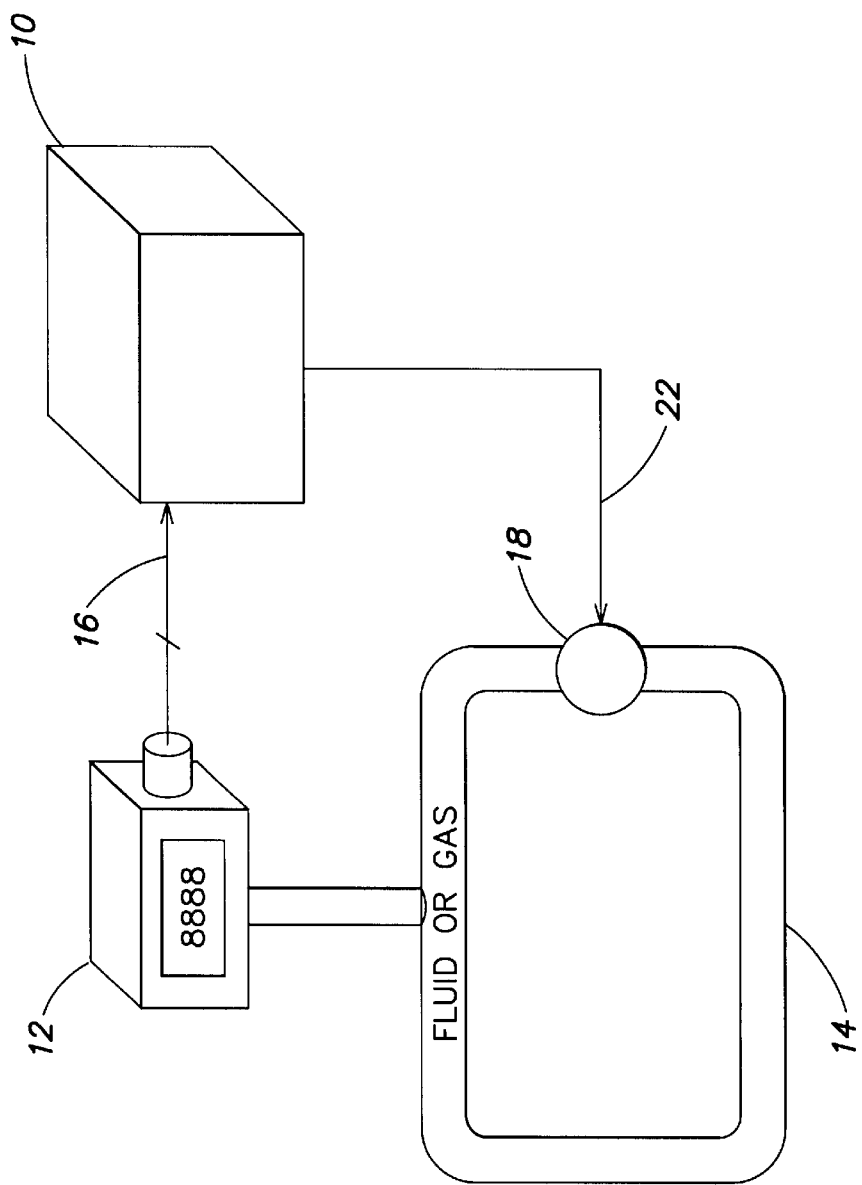
FIG. 1 is a schematic block diagram of a process application including a sensor mechanism and a utilization mechanism.

Referring to FIG. 1, a typical industrial process application is illustrated in which the teachings of this invention may be utilized. A remote device, such as a sensor mechanism 12, is connected to an input of a utilization mechanism 10 via a two-wire connection 16, the sensor mechanism providing information to the utilization mechanism and receiving all its required operating power from the utilization mechanism over two-wire connection 16. The utilization mechanism may be, for example, a programmable logic controller (PLC), a distributed control system (DCS), or some other suitable device. Sensor mechanism 12 may monitor a process, for example a process occurring in apparatus 14, and communicate information about the process to utilization mechanism 10. The sensor mechanism may comprise a suitable sensor such as, for example, a pressure or temperature sensor to measure the pressure or temperature of a fluid or gas in the apparatus. As discussed later in conjunction with FIG. 3, sensor mechanism 12 may incorporate a device that provides information from the sensor mechanism to utilization mechanism 10 over two-wire connection 16 to indicate, for example, when a predetermined threshold or limit has been reached. This information may be used by utilization mechanism 10 to initiate a corrective action, such as, for example, shutting down or reversing a pump 18 of the apparatus, or initiating an alarm procedure. The utilization mechanism may send signals over line 22 to control apparatus 14 and/or the process running therein.

Figure 2:
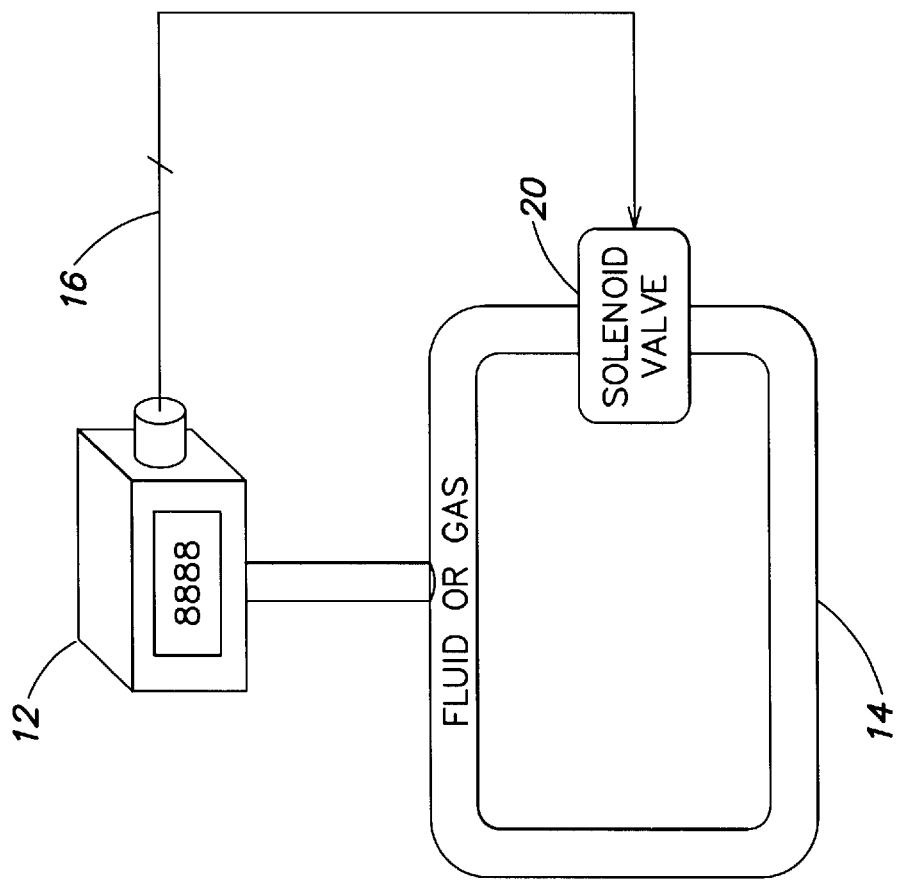
FIG. 2 is a schematic block diagram of a sensor mechanism in direct communication with a utilization mechanism running a process.

FIG. 2 illustrates a similar process application wherein sensor mechanism 12 is directly linked to apparatus 14. Sensor mechanism 12 is connected to a process controller 20, such as, for example, a solenoid valve, via a two wire connection 16, and sends signals to the process controller via the two wire connection in response to conditions of the apparatus measured by the sensor mechanism. Sensor mechanism 12 receives power from the process controller 20 via the same two-wire connection, process controller 20 being powered in standard fashion.

Although the foregoing examples have been described in terms of a sensor mechanism linked to the utilization mechanism, the invention is not so limited. The teachings of the invention may be applied to any remote device that receives its operating power from a utilization device over a two-wire connection, and not only to sensor mechanisms.

Figure 3B:
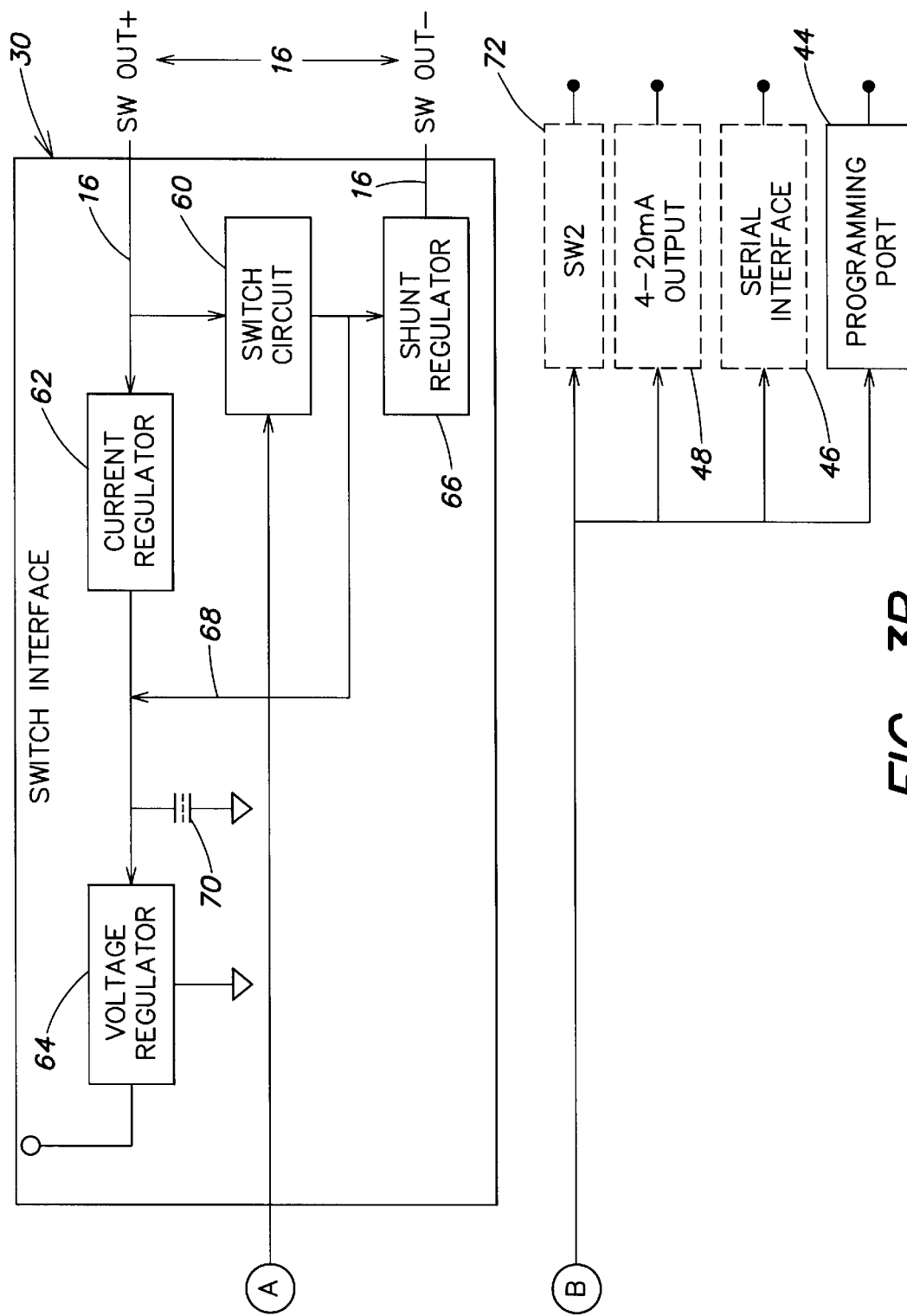

FIGS. 3A and 3B illustrate a block diagram of an illustrative sensor mechanism 12 suitable for use in the embodiments of FIGS. 1 and 2. A switch interface 30 is provided that may be coupled to sensor mechanism 12, or may be integrated with sensor mechanism 12. The switch interface enables the sensor mechanism to provide information over a two-wire connection 16 while also being powered over the same two-wire connection. For the illustrative embodiment, sensor mechanism 12 comprises a bridge type pressure sensor 32 and a temperature sensor 34. However, the sensor mechanism may be provided with a variety of suitable sensors. A sensor interface 36 is coupled to at least one of pressure sensor 32, temperature sensor 34 and any other sensor utilized. The sensor mechanism also includes a microcontroller 38 that may perform a number of control and signal processing functions, a display 40, and a keypad 42. Microcontroller 38 may include a storage element 31 for example a non-volatile memory such as an EEPROM, that may store configuration data, calibration data, and/or fault codes. The sensor mechanism further comprises one or more optional I/O ports, such as a programming port 44, a serial interface port 46, a second switch output 72, and a 4–20 mA output 48.

Pressure sensor 32 which may be used to sense the pressure of a fluid or gas in a process monitored by the sensor mechanism, is energized by either a switchable voltage Vcc or a current Ics applied to its terminal 50, and a voltage proportional to the pressure sensed is generated on bridge output terminals 52a,b. Sensor interface 36 receives a signal from the pressure sensor and provides a signal proportional to the pressure sensed to microcontroller 38. Sensor interface 36 amplifies the voltage provided at the bridge output terminals 52a,b, if necessary, using, for example, a differential gain amplifier 53. Sensor interface 36 may include a variable gain circuit 54 to allow the sensor mechanism to operate with a variety of different pressure or other sensor types having different output levels.

Temperature sensor 34 is excited by a current Ics on line 56 that results in a temperature dependent voltage across output lines 58, which lines are connected to input terminals 59 of sensor interface 36. Sensor interface 36 performs the same functions for temperature sensor 34 as for pressure sensor 32. If sensor mechanism 12 includes both the temperature sensor and the pressure sensor, sensor interface 36 may include a multiplexer 37 that, depending on the state of its select line, allows either $V_{cc}$ to be applied to terminal 50 of the pressure sensor, or Ics to be applied to input line 56 of the temperature sensor. If sensor mechanism 12 includes additional sensors, additional circuitry may be provided with additional inputs to enable it to selectively excite and monitor additional sensors.

Sensor mechanism 12 may communicate, via switch interface 30, information regarding the process either directly to the apparatus, as illustrated in FIG. 2, or to utilization mechanism 10, as illustrated in FIG. 1. Switch interface 30 comprises a switch circuit 60 across two wire connection 16, the on/off states of the switch circuit providing selected information concerning the process. Switch interface 30 also regulates power provided via two wire connection 16 to components of the sensor mechanism. Sensor mechanism 12 derives all its operating power from the device to which it is connected via two wire connection 16, without any need for additional power connections. The sensor mechanism operates off leakage current from the utilization mechanism, without the utilization mechanism needing to be aware of the presence of the sensor mechanism. Thus the single two-wire connection serves to provide both power to and communication from the sensor mechanism. This feature enables the switch interface and associated circuitry to be used as a direct replacement for electromechanical switches, such as those described previously.

For the illustrative embodiment, switch circuit 60 may be switched between an open state and a closed state, the switch circuit 60 presenting a high impedance across the terminals of the two wire connection 16 when in the open state, and a low impedance across the same terminals when in the closed state. When switch circuit 60 is in the open state, current regulator 62 limits the current to a level such that the utilization device 10 detects an open circuit, or open condition of the two wire connection 16. When the switch circuit is in the closed state, the shunt voltage regulator 66 is connected between the two wires of the two wire connection 16, thus regulating the voltage to a predetermined value that is interpreted by the utilization device as a closed circuit, or closed condition, yet allows the sensor mechanism to be fully powered. Thus, a closed condition may be determined when the switch conducts current and an output voltage is regulated to a predetermined level, and the open condition may be determined when the switch circuit 60 is open and current regulator 62 conducts less than a predetermined amount of current. Switch circuit 60 is switched between its open and closed states by the microcontroller 38 to provide selected information to the utilization device, or to a process controller. Switch circuit 60 may be an electronic switch, for example a transistor, an electromechanical switch, such as a relay, or magnetic switch, or other bistable device capable of alternating between a high impedance state and a low impedance state.

In addition to switch circuit 60, switch interface 30 includes a current regulator 62, a voltage regulator 64, a shunt regulator 66, a bypass 68 and a storage element 70. Voltage regulator 64 may be a step down regulator that provides a regulated voltage supply to microcontroller 38 and other circuitry of the sensor mechanism. Voltage regulator 64 may be, for example, a single integrated device, such as a dedicated voltage regulator integrated circuit (I.C.). Alternatively, the voltage regulator may be formed from a number of components, or may be provided as part of an I.C. performing several functions. Current regulator 62 limits the current drawn by sensor mechanism 12 when switch circuit 60 is in the open state to be below a predetermined value, such as, for example, 750 $\mu$A, which is low enough so that the utilization mechanism does not recognize it as a current flow, the utilization mechanism thus detecting an open circuit even though this low current is flowing. This current is sometimes referred to as "leakage current". When switch circuit 60 is in the closed state, shunt regulator 66 regulates the voltage between the terminals of the two-wire connection 16 to a predetermined value. Typically this value may be the maximum "on" voltage for the utilization mechanism, for example, for many utilization mechanisms this value is 4.7 volts. When switch circuit 60 is in the closed state, current regulator 62 may be bypassed by bypass 68 since more current is available from the utilization device, and sensor mechanism 12 need no longer operate on only the leakage current. Bypass 68 may be connected to switch circuit 60 or may form part of switch circuit 60. Storage element 70, which is a capacitor in the illustrated embodiment, stores energy when the available current from current regulator 62 is greater than the current needed to meet the power requirements of sensor mechanism 12. For example, storage element 70 may store excess energy when the sensor mechanism is drawing less than the available leakage current when the switch circuit is in the open state. Alternatively, storage element 70 may store excess energy that may be available when the switch circuit is in the closed state and the current is not limited by the current regulator. This stored energy may be used by the sensor mechanism when the demand for current exceeds the allowable open state current.

Microcontroller 38 includes software to control switch circuit 60 that may compare signals received from sensor interface 36, indicative of the pressure, temperature, or other measured characteristic of the process being monitored, with stored settings or thresholds. The microcontroller may open and close switch circuit 60 based on the results of these comparisons. This software may be stored in a memory 74 of the microcontroller. The microcontroller may also include an analog to digital converter 76 to convert analog signals received from the sensor interface into digital data that may be utilized by the microcontroller. In one example, the switch circuit 60 is configured for two state operation. In this configuration, a closed condition of switch circuit 60 may indicate normal operation of the process being monitored, for example, the pressure or temperature of the process being below a certain predetermined threshold. An open condition of switch circuit 60 may indicate a failure or fault condition in the process or in the sensor mechanism. Alternatively, the switch circuit may be configured for three state operation. In this configuration, the on/off state of switch circuit 60 may be continuous or may be toggled or pulsed at a selected rate to provide selected information. For example, the switch circuit may be closed when the process is functioning normally, open for an error or emergency condition, and toggled on/off for various non-emergency conditions. For example, if a predetermined threshold is exceeded by the monitored temperature or pressure of the process, the switch may be toggled between it's open and closed states. The toggle rate may sometimes be indicative of the specific condition or problem, the toggling being controlled by the microprocessor 38. Variations of bistable signals, such as, for example, digital encoding or pulse width modulation may also be employed to convey information.

Microcontroller 38 may be equipped with a low power mode of operation for operating when the switch circuit is in the open state and only a limited amount of operating current is available to the sensor mechanism. For example, microcontroller 38 may wake up at fixed intervals, briefly execute it's selected program and then return to its low power mode, thus minimizing current consumption.

The microcontroller may also perform calibration correction and temperature compensation for the data received from the process. The optional programming port 44 or optional serial port 46 may facilitate downloading of calibration and configuration data. The microcontroller may periodically output data to the optional serial port, optional 4–20 mA output 48, and/or any additional output such as, for example, a switch output 72. Outputted data may comprise information regarding, for example, the state of the switch circuit, any fault or failure conditions detected, information regarding the process being monitored, such as temperature or pressure information, calibration data, or other information regarding the process and circuitry. Any of these outputs may be connected to additional devices (not shown) via connections other than the two wire connection 16, and may allow information to be transmitted to devices other than the utilization mechanism. The second switch output 72 may have independent mode and threshold settings different from those of switch circuit 60. Second switch 72 may be powered as indicated above over a 2-wire connection, either two-wire connection 16 or its own 2-wire connection, or may require an additional, independent source of power. Furthermore, one output of the sensor mechanism, such as the switch interface, may be coupled to two or more utilization mechanisms connected in parallel on the same two-wire connection.

Sensor mechanism 12 also has an I/O capability, which may be, for example, a display 40 and a keypad 42. The display may be an LCD display, an LED display, or another appropriate display, and may indicate, for example, the pressure or temperature of the process being monitored, units of measure, and/or any fault conditions. Microcontroller 38 may include an LCD or other driver 78 that facilitates transfer of data from the microcontroller to the display. The display may be chosen to meet the lower power requirements set by the limited current provided by switch interface 30 when switch circuit 60 is in the open state. Alternatively, the display may indicate an operating mode of the sensor mechanism and/or the switch interface status. Keypad 42 allows a user to program information into the microcontroller, such as an operating mode of the switch device, and threshold limits for the process being monitored. The keypad may also allow the user access to existing settings for viewing or change. A user may, for example, enter, via the keypad 42, thresholds at which the microcontroller switches the switch circuit between the open and closed state. The user may also access mode and status information of the process, and/or the sensor mechanism.

The sensor mechanism may also include a digital interface, such as interface 46, to communicate remotely, device data, the state of the switch circuit 60, health of the circuitry (i.e., whether any fault conditions have been detected or whether the circuitry is operating according to normal parameters), and other information. An additional wire connection could be made for such remote communication, or an RF or other suitable transmitter may be used for this function.

Figure 4:
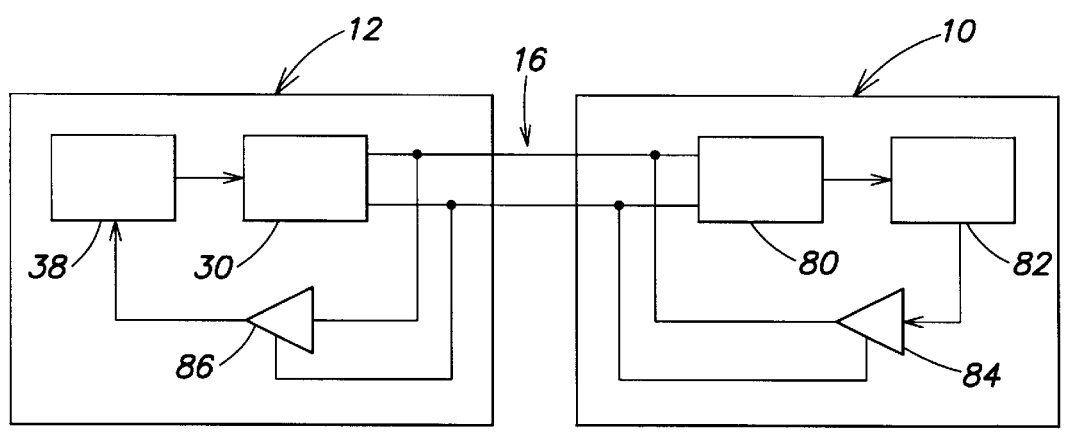
FIG. 4 is a schematic block diagram of a sensor mechanism and utilization mechanism capable of two-way communication over a two-wire connection.

Referring to FIG. 4, according to another embodiment, the sensor mechanism 12 and utilization mechanism 10 may be capable of two-way communication via the two-wire connection 16. During such two-way communication, the sensor mechanism still derives all its operating power from the utilization device via two wire connection 16, as described previously. According to one illustrative embodiment, the utilization mechanism includes an input 80 that receives information from the sensor mechanism according to the method described above, a processor 82, and a transmitter 84. The processor may send information or control signals to the sensor mechanism, over the two-wire connection, via the transmitter. The transmitter may include a switch, such as any of the switching mechanisms previously described, that may present a high impedance across the terminals of the two wire connection 16 when in the open state, and a low impedance across the same terminals when in the closed state. When the transmitter switch is open, the system may operate as described previously, with the sensor mechanism operating off of leakage current from the utilization mechanism during the time periods when its switch circuit 60 (referring to FIG. 3B) is open, and utilizing the bypass circuit 68 when its switch circuit 60 is closed. The receiver 86 may monitor the two-wire connection 16, to detect any change in the voltage level on the two-wire connection. When a voltage change is detected and the switch circuit 60 is open, this may indicate that the transmitter switch of the utilization mechanism is closed, and that information is being transmitted. When the transmitter switch is closed, the sensor mechanism may utilize the bypass circuit 68, since more current may be available from the utilization mechanism, and the shunt regulator may regulate the voltage between the two-wire connection to a predetermined value, as discussed previously in reference to FIGS. 3A–B. Thus, in a manner similar to the manner in which switch interface 30 provides information from the sensor mechanism to the utilization mechanism, the utilization mechanism may transmit data or control signals to the sensor mechanism. In addition to the two state or three state operation of the switch described previously, information may also be transmitted to and from the utilization mechanism as binary encoded data. An encoding protocol such as on-off keying may be used to transmit the data. This protocol is simple to implement as it requires only switching the switch between the open and closed states in accordance with a binary code representing the data. However, other binary encoding protocols may also be implemented if desired.

According to one example, the sensor mechanism includes a receiver 86 that is connected across the terminals of two-wire connection 16. The receiver is connected to an input terminal of the microcontroller 38, and may be adapted to provide a signal, representative of the signal sent from the utilization mechanism, to the microcontroller. The microcontroller may be programmed to perform certain functions or processes in response to different signals received from the utilization mechanism. This feature may allow the utilization mechanism to actively control the sensor mechanism and to, for example, cause a measurement to be taken, request health or status information, etc.

The microcontroller may further be programmed to perform a bus arbitration function so as to enable both the sensor mechanism and the utilization mechanism to send and receive information over the two-wire connection and to distinguish information being sent from one to the other. For example, the microcontroller may disable its input connected to the receiver 86 during time periods when the sensor mechanism is transmitting data to the utilization mechanism over the two-wire connection. Alternatively, processor 82 may perform the bus arbitration function. In yet another example, microcontroller 38 may be programmed to respond only to specific code sequences that may be sent from the transmitter, thus minimizing the possibility that the microcontroller may misinterpret data sent from the sensor mechanism as a control signal from the utilization mechanism.

Having thus described various illustrative embodiments and variations of selected components, other modifications are also possible. For example, while several functions and features have been described above as being implemented in software on the microcontroller, it is to be appreciated that these functions could be implemented in whole or in part in hardware, or in other ways known to those of skill in the art. Further, while the remote device for the preferred embodiment is a sensor, this is not a limitation on the invention, and the teachings of this invention could be utilized for the powering of other appropriate remote devices. Thus, while particular examples and embodiments have been described, improvements, modifications and other changes in form and detail that are considered to be within the spirit and scope of the invention, may be apparent to one of skill in the art. Accordingly, the above-description is intended for example only, and the scope of the invention should be determined from proper construction of the appended claims.

What is claimed is:

1. An interface that provides selected information from a sensor mechanism to a utilization mechanism over a two-wire connection, power for the interface and the sensor mechanism being received from the utilization mechanism over the two-wire connection, the interface comprising:

a switch circuit connected between first and second wires of the two-wire connection, the switch circuit providing a high impedance between the first and second wires when open and a low impedance between the first and second wires when closed, switch circuit state being selectively controlled by the sensor mechanism, current flow through the switch circuit being sensed by the utilization mechanism as indicative of the selected information from the sensor mechanism;

a voltage regulator that provides a selected voltage to at least selected components of the interface and the sensor mechanism; and a current regulator, operative at least when the switch circuit is open, that regulates output current provided to the voltage regulator from the first and second wires to below a predetermined level.

2. The interface as claimed in claim 1, further comprising a bypass that bypasses the current regulator when the switch circuit is closed, enabling a higher current than the output current of the current regulator to be provided to the voltage regulator.

3. The interface as claimed in claim 1, further comprising a shunt regulator, operative when the switch circuit is closed, that regulates a voltage across the two-wire connection to a predetermined level.

4. The interface as claimed in claim 3, wherein the shunt regulator is connected in series with the switch circuit.

5. The interface as claimed in claim 1, further comprising a storage element that stores energy from the current regulator.

6. The interface as claimed in claim 5, wherein the storage element is a capacitor.

7. The interface as claimed in claim 1, wherein the sensor mechanism monitors a process and compares a measured condition of the process with a predetermined threshold, and wherein the information comprises:

a below-threshold operating condition of the process;

an above-threshold operating condition of the process; and a fault condition of the sensor mechanism.

8. The interface as claimed in claim 1, wherein the interface comprises a receiver connected to the two-wire connection, the receiver being adapted to receive information from the utilization mechanism over the two-wire connection.

9. An interface that provides information from a remote device to a utilization mechanism over a two wire connection, the interface comprising:

a switch circuit that provides a high impedance between first and second wires of the two wire connection when in an open state and a low impedance between the first and second wires when in a closed state, the state of the switch circuit being indicative of the information from the remote device;

a voltage regulator that provides a regulated voltage to at least one component of the remote device;

a current regulator, coupled to the voltage regulator and the switch circuit, that limits current provided to the voltage regulator when the switch circuit is in the open state;

a shunt regulator, coupled to the switch circuit, that regulates a terminal voltage across the two-wire connection to a predetermined level when the switch circuit is in a closed state;

a bypass that bypasses the current regulator when the switch circuit is in the closed state to enable a higher current to be provided to the voltage regulator; and wherein the interface and the remote device receive operating power from the utilization mechanism over the two wire connection.

10. The interface as claimed in claim 9, wherein the current regulator limits the current provided to the voltage regulator to below a predetermined level at which the utilization mechanism interprets the switch circuit as being in the open state.

11. The interface as claimed in claim 9, wherein the remote device comprises a sensor mechanism that monitors a process and the information comprises:

a first condition of the process indicated by an open state of the switch circuit;

a second condition of the process indicated by a closed state of the switch circuit; and a third condition of the process indicated by a pulsing of the switch circuit between the open state and the closed state.

12. The interface as claimed in claim 9, further comprising a storage element that stores the energy provided to the voltage regulator.

13. The interface as claimed in claim 12, wherein the storage element is a capacitor.

14. The interface as claimed in claim 9, further comprising a receiver connected to the two-wire connection, the receiver being adapted to receive information from the utilization mechanism over the two-wire connection.

15. A method of providing selected information from a sensor mechanism to a utilization mechanism over a two-wire connection, the sensor mechanism receiving operating power from the utilization mechanism, the method comprising:

providing a signal from the sensor mechanism over the two-wire connection;

switching a switch circuit of the sensor mechanism between a closed state and an open state to provide the selected information from the sensor mechanism, the switch circuit passing the signal back to the utilization mechanism when in the closed state and the switch circuit presenting a high impedance across the two-wire connection when in the open state;

providing an input to a voltage regulating device, a regulated output voltage being provided by the voltage regulating device to the sensor mechanism;

limiting current provided to the voltage regulating device when the switch circuit is in the open state to below a level at which the utilization mechanism interprets the switch circuit as being in the closed state; and regulating a voltage across the two-wire connection when the switch circuit is in the closed state to a predetermined value.

16. An interface for providing selected information from a sensor mechanism to a utilization mechanism over a two-wire connection, the interface comprising:

a bistable component that provides a high impedance between first and second wires of the two wire connection when in a first state and a low impedance between the first and second wires when in a second state.

voltage regulating means for controlling a voltage provided to at least selected components of the sensor mechanism; and means for limiting current provided to the voltage regulating means from the two-wire connection when the bistable component is in its first state to a current less than that recognized by the utilization mechanism as an indication of the bistable component being in its second state;

wherein power for the interface and the sensor mechanism is received from the utilization mechanism over the two-wire connection.

* * * * *